ROBERT A. KIRBY
GERALD M. WEBSTER INVENTOR.

BY John D. Gassett
ATTORNEY

ROBERT A. KIRBY
GERALD M. WEBSTER INVENTOR.

BY *John D. Gassett*

ATTORNEY

Nov. 2, 1965

R. A. KIRBY ETAL 3,215,223

RECOILLESS SEISMIC SOURCE

Filed May 10, 1962

ROBERT A. KIRBY
GERALD M. WEBSTER INVENTOR.

BY John D. Gassett

ATTORNEY

3,215,223
RECOILLESS SEISMIC SOURCE

Robert A. Kirby and Gerald M. Webster, Tulsa, Okla., assignors, by mesne assignments, to Esso Production Research Company, Houston, Tex., a corporation of Delaware
Filed May 10, 1962, Ser. No. 193,818
6 Claims. (Cl. 181—.5)

The present invention is concerned with a system for generating seismic pulses. The invention is especially concerned with a system for generating seismic impulses which can be used without the drilling of seismic shot holes.

The use of seismic impulses for studying the earth's substrata is well known. In general, an artificial seismic disturbance is set up near the earth's surface. A portion of the seismic disturbance travels downwardly until it encounters a subsurface discontinuity such as an interface between two strata and then a portion of the energy is reflected back toward the surface of the earth. Sensitive detection devices, sometimes known as geophones, are placed in the vicinity of the disturbance and detect the reflected energy. By measuring the time intervals between the initiation of the seismic impulses and the reception of the reflected energy at each of many detection stations, it is possible to learn a great deal about the nature and structure of the earth's subsurface. The use of seismic prospecting procedure has found particular application in prospecting for petroleum.

In employing seismic methods in search for oil and gas, a widely used practice consists in drilling a so-called shot hole into which a dynamite charge can be placed and later detonated. A normal shot hole may vary in depth from as shallow as about 50 feet to as deep as about 250 feet. After the shot hole has been drilled and the dynamite placed therein, and geophones planted about the area, the dynamite is then detonated. A part of the energy of the down-travelling pulse is reflected by subsurface layers. The reflected energy is detected at the surface by geophones. While this system has proved quite useful in the exploration for oil and gas, it is also a rather expensive operation. One of the greater expenses in this system is the drilling of the shot holes. Various systems have been attempted to remove the necessity of drilling shot holes. One which is presently receiving wide attention is the so-called "thumper" system wherein a heavy weight is lifted above the earth's surface and is dropped. This imparts a seismic shock into the earth. While this system has been shown to be of certain value, it also has certain drawbacks. For example, a considerable amount of heavy hoisting equipment is required to lift the weight so that it can be dropped.

Briefly in a preferred embodiment, the invention uses an upright cylindrical-like housing. A piston is slidably mounted in the lower end portion and has a piston rod extending out the lower end in a slidable and sealing relationship with the lower end of the housing. An impact plate or mass for striking the earth is attached to the lower end of the piston rod. A free floating reaction mass piston is slidably mounted in the upper part of the housing above the piston. A power generating chamber is provided between the piston and the reaction mass piston and when actuated, forces the piston downwardly so that the impact plate strikes the ground with a force so as to impart a seismic shock into the earth. The reaction from the force which drives the piston downwardly, drives the reaction mass piston upwardly so that there is no reaction force on the housing itself. One-way dash pot means are provided so that when the large reaction mass starts down, the downward rate of movement is quite slow. The one-way dash pots then give a reaction on the housing or the support for the housing approximately equal to the weight of the reaction mass piston. The energy acquired by the large mass is thus dissipated as heat as it descends; thus the system is a high-energy seismic source with essentially no recoil.

Various objects and a better understanding of the invention may be had from the following description taken in conjunction with the drawings in which.

Figure 1:
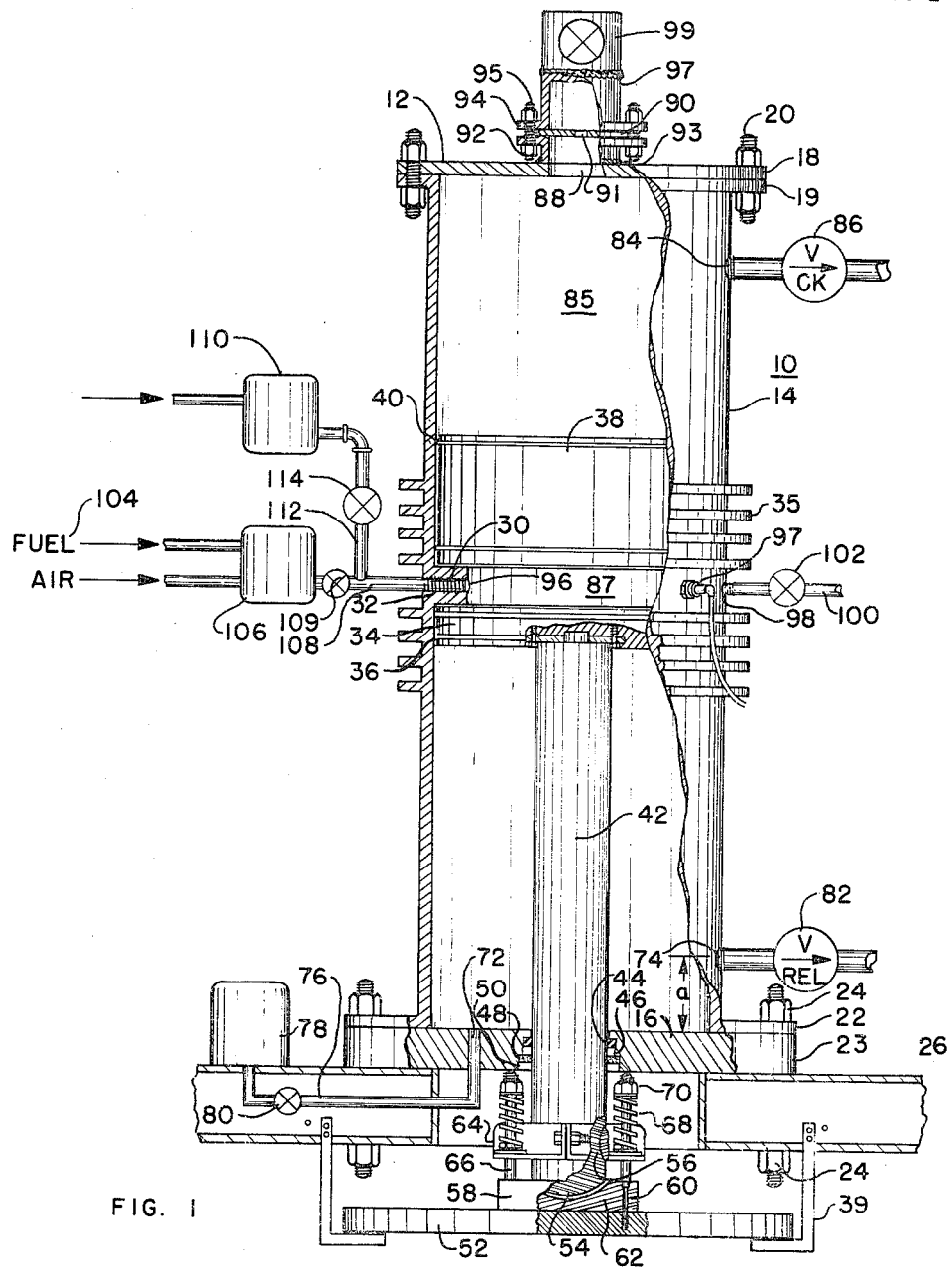
FIG. 1 illustrates, partially in section, a preferred embodiment of the invention.

Turning to the drawing and FIG. 1 in particular, there is illustrated the best mode contemplated for carrying out the invention. Illustrated thereon is a vertical elongated housing 10 which is preferably cylindrical. For convenience of assembly and construction, the housing can be divided into various portions or sections. As illustrated in FIG. 1, it is divided into an upper porton or end member 12, cylindrical portion 14, and a lower end member 16. The upper end member 12 can be attached to the cylindrical member 14 by flange and bolt assembly as illustrated by flanges 18 and 19 and bolt 20. Likewise, lower end member 16 can be fastened to cylindrical member 14 by flanges 22 and 23 and bolt 24. The housing is supported from a supporting member such as frame 26 also by bolts 24.

Mounted on the inner wall of cylindrical section 14 are upper stop 30 and lower stop 32. The stops 30 and 32 can be internal annular shoulders. A piston 34 is mounted in the lower portion of housing 10 and has vertical movement between stop 32 and end member 16. Rings 36 provide a sealing relationship between the piston and the interior wall of the housing.

Mounted in the housing 10 above stop 30 is a free floating reaction mass piston 38 which has vertical movement between stop 30 and end plate number 12. The free floating reaction mass piston 38 has rings 40 which provide for a sealing relationship between the reaction mass piston and the interior wall of housing 10.

Piston 34 has a piston shaft or a rod 42 which extends through the lower end plate 16 in a sealing and sliding relationship. In the bore of plate 16 through which the shaft extends, there are seals 44 which are carried by end plate 16 and held in place by retaining nut 46. A wiper ring 48 is mounted about shaft 42 and held in position by retaining ring 50 threadedly connected to plate or end member 16.

Mounted on the lower end of shaft 42 is impact mass or plate 52. When piston 34 is in its uppermost position, plate 52 is carried a height above the ground which permits the impact plate to strike the earth before piston 42 has moved to where it strikes the lower end of 16 of the housing. Support members 39 are provided to hold impact mass 52 in its upper position during periods when the device is not being used. During operations support members 39 are removed from the downward path of impact mass 52.

The preferred manner of attaching impact mass 52 to shaft 42 is illustrated in FIG. 1. This arrangement permits the impact mass to pivot slightly on shaft 42 to accommodate irregularities in the ground, such as a rock or the like. Shown in FIG. 1 is the lower end of shaft 42 which is rounded at 54 at its lower end. Close to its lower end is a groove 56. A pivot plate 58 is rigidly attached to impact mass 52 by bolts 60, for example.

Pivot plate 58 has a recessed portion or pivot 62 which receives the rounded section 54 of shaft 42 in a pivotally fitted relationship. Mounted in groove 56 of shaft 42 is retaining collar 64. Collar 64 is thus rigidly clamped to shaft 42. It is preferred that plate 58 be permitted to pivot about the lower end of shaft 42 about 15° up or down from the normal to the axis of shaft 42. Extending upwardly from plate 58 are bolt means 66 which are securely fastened to plate 58. Bolts 66 extend upwardly through plate 64. A spring 68 is mounted about bolt 66 above plate 64 and is held in position there by nut 70. Impact mass 52 then is seen to be supported by shaft 42 through pivot plate 58, bolts 66, spring 68 and retaining collar 64. Rapid acceleration of piston 46 is transmitted through shaft 42 to pivot plate 58 and to impact plate 52.

Provided in the lower end of housing intermediate section 14 is a low pressure inlet port 72 and a low pressure air exhaust port 74. A conduit 76 connects a low pressure gas source 78 to port 72. A valve 80 is provided in conduit 76. A low presure relief valve 82 is provided for outlet port 74.

An exhaust port 84 is provided in the wall of the upper portion of the housing. A check valve 86 is provided in port 84 and permits flow of fluid only outwardly from the interior of the housing.

In the end plate 12 there is a port means 88. Mounted above port means 88 is an orifice plate 90 which is held in position by lower orifice flange 92 and upper orifice flange 94. Lower orifice flange 92 is rigidly attached to end plate 12 as by welding 93. Orifice plate 90 is positioned between lower flange 92 and upper flange 94 and the two flanges are secured together by bolts 95. A cylindrical member 97 is made integral with and extends upwardly from flange 94. An adjustable valve 99 is in member 97. Orifice plate 90 having orifice 91 and check valve 86 cooperate with snubbing chamber 85 (the interior of housing 10 above reaction mass 38 to dampen the fall of free piston reaction mass 38, as will be seen more clearly hereinafter.

Between free piston reaction mass 38 and piston 34 there is provided within housing 10 a power generating or combustion chamber 87. Between upper stop 30 and lower stop 32 there are provided in the walls of intermediate housing section 14 an inlet port 96 and an outlet port 98 for chamber 87. An outlet conduit 100 is connected to outlet port 98 and is provided therein with valve 102. Fuel from a fuel source 104 and air are provided in a conventional manner to a carburetor 106. The outlet of carburetor 106 is connected through conduit 108 to inlet port 96. A compressed air source 110 is connected through conduit 112 having valve 114 to conduit 108 for purging chamber 87 when and if desired.

Intermediate housing section 14 can be provided with heat transfer means. For example, as shown in FIG. 1, mounted about the outer periphery of intermediate housing section 14 is a plurality of heat transfer fins 35.

Figure 3:
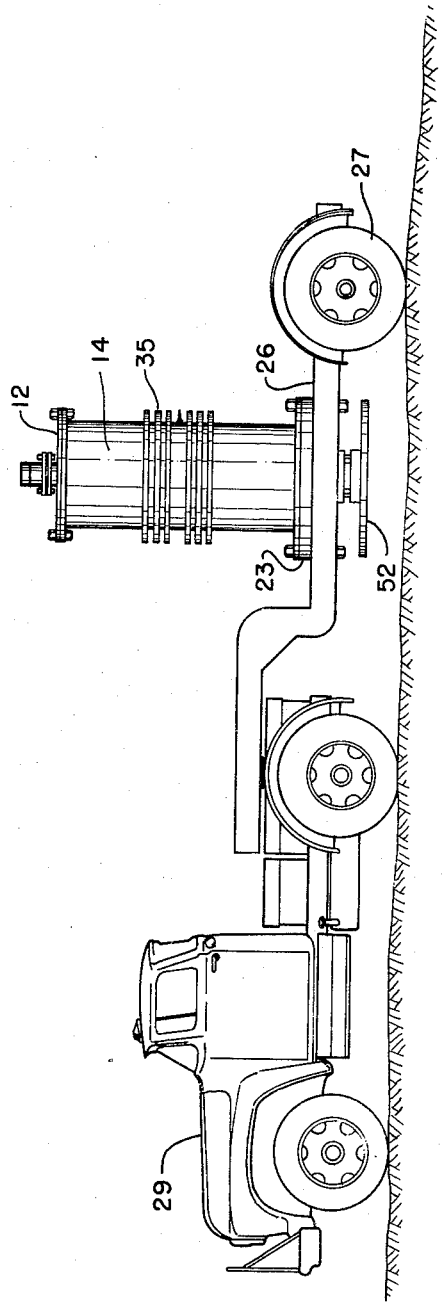

FIG. 3 illustrates one means of transporting the source from one location to another. Frame 26 is shown as being a part of a semi-trailer supported from wheels 27 in a conventional manner. The trailer is drawn by a truck 29.

Having described the apparatus of FIG. 1, attention will now be directed briefly toward its operation. The device is positioned at a location at which it is desired to generate a seismic signal. Compression chamber exhaust valve 102 is opened. Valve 114 in conduit 112 is closed so as to keep the compressed air from entering combustion chamber 96. As the pressure $P_1$ above free piston reaction mass 38 is substantially the same as $P_2$ in the combustion chamber, reaction mass 38 will rest on stop 30. Low pressure gas from source 78 is fed to conduit 76 and valve 80 into the housing beneath piston 34. The gas needs to be under only sufficient pressure to lift the piston 34, shaft 42, impact plate 52 and associated parts. This pressure can be very small, for example in the neighborhood of 5 pounds. Low pressure relief valve 82 is set to open at a pressure slightly in excess of the pressure of the low pressure gas which is used to raise the piston to its uppermost position against lower stop 32.

At this time valve 102 is closed. The combustible mixture from carburetor 106 is fed through conduit 108 to combustion chamber 96. Conduit 108 contains the necessary valve means 109 so that when the combustion chamber 96 has been charged, valve 109 is closed. Before the combustible mixture is ignited, low presure air valve 80 is closed. Assuming that the apparatus is positioned in an upright position over the location at which it is desired to impart the seismic impulse into the earth, the tool is now ready to be actuated. Combustion is initiated in combustion chamber 96 by the energization of spark plug 97. Upon the ignition of the combustible mixture in chamber 96 a tremendous force is exerted downwardly on piston 34. This downward force is transmitted through shaft 42 to plate 52. In order that the pressure in the housing below piston 32 does not build up, valve 82 is set to open at a low pressure which, as mentioned previously, is only slightly greater than the pressure required to raise the piston and its associated parts. The piston 34 is driven downwardly with a force which gives it great acceleration. The amount of force dependent partly upon the nature of the combustible mixture and the amount of such mixture. Impact plate 52 then strikes the earth with a tremendous impact thus giving a seismic impulse to the ground at the location of the device. It will be noted that port 74 is a short distance above the end plate 16. This distance "a" can normally be about equal to the thickness of piston 34, although the distance is not critical. The purpose of having port 74 a distance above plate 16 is to provide a cushion for piston 34 in event the earth is a greater distance below impact plate 52 than the stroke of piston 34. When piston 34 passes port 74, then there is a cushion chamber formed beneath the piston and above bottom plate 16 interior of the housing section 14. Further movement of piston 34 downwardly tends to compress this and prevents serious impact of piston 34 against end member 16.

At the same time that piston 34 is forced downwardly, the reaction thrust forces free piston reaction mass 38 upwardly. The air in snubbing chamber 85 goes out through port 84 and check valve 86 to the atmosphere. Port 84 is large compared to orifice 91. There are preferably several ports 84 to prevent buildup of pressure in chamber 85 by the upward movement of mass 38. Thus there is essentially no break or reaction force exerted on end plate 12 of the housing 10 so long as the reaction mass is not forced past port 84. If reaction mass 38 is driven above port 84, a cushioning chamber is formed above port 84 by reaction mass 38 and below end plate 12 interior of housing section 14. The compression of the air prevents the mass 38 from directly striking end plate 12 causing internal mechanical damage to the system. However, it is to be understood that in most operations piston reaction mass 38 will not be forced to a height where a cushioning will become necessary as it is desired that no vertical force be applied on the housing proper. The cushioning effect then is a safety or precautionary measure.

A discussion will now be had of the operation of those means which prevent free piston reaction mass 38 from falling rapidly and with great acceleration onto shoulders or stops 30. When free floating reaction mass 38 has reached its uppermost position caused by the force of a combustible mixture in chamber 96, it will then of course start its descent. However, this downward motion is caused to be very slow. The reaction mass has forced most of the air out of the snubbing chamber 85 through check valve 86 which is a very large area as compared to orifice 91 in orifice plate 90. Thus as free piston reaction mass 38 starts to drop, there is a partial vacuum built up in chamber 85. The pressure $P_1$ in chamber 85 is much less than pressure $P_2$ below reaction mass 38. Thus the differential pressure tends to force the reaction mass upwardly. At this time combustion chamber exhaust valve 102 can be opened and the pressure in chamber 96 is greatly reduced. Then pressure $P_2$ is reduced so the differential pressure across the reaction mass 38 is likewise reduced, and the piston reaction mass 38 slowly descends. The rate of descent will depend to a large extent upon the size of orifice 91. A very small orifice will maintain a low pressure $P_1$, thus the free floating reaction mass 38 is lowered gently onto stop 30. Thus in the whole operation there is essentially no vertical reaction force exerted on the cylindrical housing 10. The energy acquired by the large mass is dissipated as heat as it descends.

Figure 2:
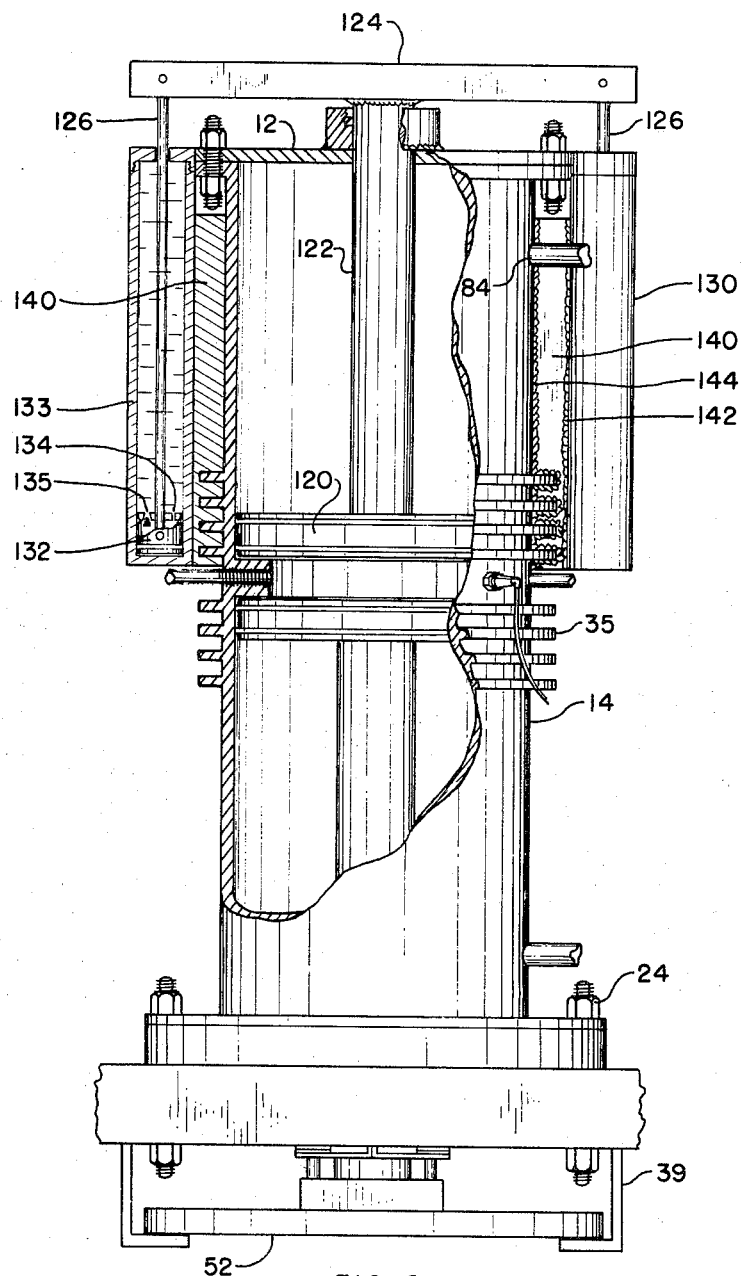
FIG. 2 illustrates another embodiment of the device of FIG. 1 which illustrates another dampening means for the free piston reaction mass; and, FIG. 3 illustrates the embodiment of FIG. 1 mounted for transportation.

Another means of dissipating the energy of the reaction mass after it has been lifted is shown in FIG. 2. Shown therein is a free-floating piston 120 which has free vertical movement within the upper portion of intermediate housing section 14 similarly as free floating reaction mass piston 38 of FIG. 1. Extending upwardly from piston 120 is rod 122 which extends through end plate 12 in a sliding relationship therewith. Mounted on the upper end of rod 122 is a large reaction mass 124. Port 84 is provided similarly as in FIG. 1; however, check valve 86 is not used.

Mass 124 is supported by support rods 126 from single acting dash pots 130. Cylinder 133 is supported from and exterior of housing 14 by support member or web 140 which is welded to cylinder 133 and housing 14 by welds 142 and 144 respectively. Rods 126 are connected to piston 132 which is within cylinder 133. Dash pots 130 are single acting or one-way type dash pots. That is, the movement of piston 132 is relatively unimpeded in its upward movement in relation to cylinder 133. However, the downward movement of piston 132 is quite retarded. This, of course, can be accomplished in any conventional manner such as, for example, having check valve 135 permit the fluid in cylinder 133 to flow downwardly only through the piston so that such fluid does not form a serious barrier to the upward movement of piston 132. However, the downward movement is greatly retarded due to the only means for the fluid to pass from beneath the piston to above it is through port or orifice 134 which is quite small.

While there are above disclosed but a limited number of embodiments of the structure of the invention herein presented, it is possible to produce still other embodiments without departing from the inventive concept herein disclosed. It is therefore desired that only such limitations be imposed on the appended claims as are stated therein.

What is claimed is:

1. An apparatus for generating a seismic impulse by striking the earth with an impact plate which comprises in combination:
   a cylindrical housing member closed at its upper end and closed at its lower end and having an upper section and a lower section;
   a free piston reaction mass slidably mounted in the upper section of said housing member and having longitudinal movement between an upper position and a lower position therein;
   a piston slidably mounted in the lower section of said housing member and having longitudinal movement therein between an upper position and a lower position;
   a piston shaft rigidly connecting said piston to the impact plate, said piston shaft extending through the lower end of said housing member in a slidable sealing relationship;
   a power generating chamber within said housing member for generating force between said piston and said free piston reaction mass;
   damping means to slow the movement of said free piston reaction mass from an upper position to its lower position to less than its free fall speed; and
   means to reposition said piston to its uppermost position after it has been forced downwardly;
   said damping means including an exhaust passageway through the wall of an upper portion of said housing member, a check valve in the exhaust passageway and of a character to permit flow of fluid outwardly only, and an orifice in the upper end of said housing member.

2. An apparatus for generating a seismic disturbance by striking the earth with an impact plate which comprises in combination:
   a housing;
   a piston slidably mounted in said housing;
   a reaction mass slidably mounted in said housing above said piston;
   power generating means for generating force between said reaction mass and said piston;
   a piston rod connecting said piston to the impact plate;
   damping means of a character to restrict the downward movement of said reaction mass toward said piston; and
   means to position said piston in its uppermost position;
   said damping means including an exhaust passageway through the wall of an upper portion of said housing, a check valve in the exhaust passageway and of a character to permit flow of fluid outwardly only, and an orifice in the upper end of said housing.

3. An apparatus for generating a seismic impulse by striking the earth with an impact plate which comprises in combination:
   a cylindrical housing having an upper end member and a lower end member;
   a piston slidably mounted in said housing;
   a piston rod extending through the lower end member of said housing in a sealing and sliding relationship and connected to said impact plate exterior of said housing;
   a free-floating piston slidably mounted in said housing above said piston;
   means to position said piston and said free-floating piston in a spacial relationship intermediate the end members of said housing so as to form a power generating chamber between said piston and said free-floating piston; and
   acceleration retarding means of a character to retard the downward movement of said free-floating piston and have essentially no effect upon its upward movement;
   said acceleration retarding means including an exhaust passage means in the wall of said housing, check valve means in said exhaust passage means and of a character to permit flow of fluid outwardly only, and an orifice in the upper end member of said housing.

4. An apparatus for generating a seismic impulse by striking the earth with an impact plate which comprises in combination:
   a cylindrical housing having an upper end member and a lower end member;
   a piston slidably mounted in said housing;
   a piston rod extending through the lower end member of said housing in a sealing and sliding relationship and connected to said impact plate exterior of said housing;
   a free-floating piston slidably mounted in said housing above said piston;
   means to position said piston and said free-floating piston in a spacial relationship intermediate the end members of said housing so as to form a power generating chamber between said piston and said free-floating piston; and
   acceleration retarding means of a character to retard the downward movement of said free-floating piston and have essentially no effect upon its upward movement;

said acceleration retarding means including a one-way dash pot means having a piston therein, said dash pot having its case securely fixed in relation to said housing, a second piston rod extending upwardly from said free-floating piston, the upper end of said second piston rod extending beyond the upper end member of said housing, a third piston rod connected to the piston of said dash pot and extending upwardly from the case thereof, and means rigidly connecting said second piston rod and said third piston rod.

5. An apparatus for generating a seismic impulse by striking the earth with an impact plate which comprises in combination: a cylindrical housing member having two spaced-apart annular shoulder members interior said housing member and intermediate the ends thereof; lower end member closing the lower end of said housing member; an upper end member closing the upper end of said housing member; a first slidably mounted in the housing member between the lower of said annular shoulder members and said lower end member; a free-floating reaction piston slidably mounted in said housing member between the upper of said annular shoulder members and the upper end member; a piston shaft connected to said first piston and extending through said lower end member in a sealing and sliding relationship therewith, the lower end of said piston shaft connected to said impact plate; first port means in the wall of said housing member between said annular members and establishing fluid communication between the exterior of said housing member; an exhaust port in the wall of said housing member adjacent said upper end member; a check valve in said exhaust port and of a character to permit flow of fluid outwardly only; an orifice in the upper end member; means to inject a combustible mixture through said first port means; exhaust means for exhausting the space between said first piston and said free-floating reaction piston to the atmosphere; second port means in said lower end member; means to inject a low pressure gas through said second port so as to raise said first piston; a pressure relief port means in said housing adjacent the lower end thereof; a relief valve in said relief port means.

6. An apparatus for generating a seismic impulse by striking the earth with an impact plate which comprises in combination: a cylindrical housing member having two spaced apart annular shoulder members interior said housing member and intermediate the ends thereof; a lower end member closing the lower end of said housing; an upper end member closing the upper end of said housing member; a piston slidably mounted in the housing member between the lower of said annular shoulder members and said lower end member; a reaction mass slidably mounted in said housing member between the upper of said annular shoulder members and the upper end member; a piston shaft connected to said piston and extending through said lower end member in a sealing and sliding relationship therewith, the lower end of said piston shaft being connected to said impact plate; first passage means in the wall of said housing member between said annular shoulder members and establishing fluid communication between the interior and exterior of said housing member; exhaust passage means in the wall of said housing adjacent said upper end member; means to inject a combustible mixture through said first passage means; exhaust means for exhausting the space between said piston and said reaction mass to the atmosphere; second passage means in the lower end member; means to inject a low pressure gas through said second passage means so as to raise said piston; a pressure relief passage means in said housing adjacent the lower end member thereof; a relief valve in said relief passage means; a dash pot chamber securely fixed to the exterior of said housing member, said chamber and said housing member having parallel longitudinal axis; dash pot piston means within said dash pot chamber and of a character to move upwardly with ease but having a retarded downward movement within said dash pot chamber; a second piston rod extending upwardly from said dash pot piston means; a third piston rod extending upwardly from said reaction mass; and means to rigidly connect said second and said third piston rods.

References Cited by the Examiner
UNITED STATES PATENTS

| 1,867,098 | 7/32 | Rieber | 181—.5 |
| 2,203,140 | 6/40 | Green | 181—.5 |
| 2,854,962 | 10/58 | Bergman | 173—139 XR |
| 2,898,084 | 8/59 | Eckel et al. | 175—1 |
| 3,029,733 | 4/62 | McElroy | 181—.5 X |
| 3,056,104 | 9/62 | De Kanski et al. | 181—.5 |

SAMUEL FEINBERG, *Primary Examiner.*

CHESTER L. JUSTUS, *Examiner.*